(12) United States Patent
Fitzell, Jr.

(10) Patent No.: US 7,157,041 B2
(45) Date of Patent: Jan. 2, 2007

(54) THERMOFORMING METHOD AND APPARATUS

(75) Inventor: James Richard Fitzell, Jr., Flint, MI (US)

(73) Assignee: Corvac Composites, LLC, Grandville, MI (US)

( * ) Notice: Subject to any disclaimer, the term of this patent is extended or adjusted under 35 U.S.C. 154(b) by 88 days.

(21) Appl. No.: 10/807,760

(22) Filed: Mar. 24, 2004

(65) Prior Publication Data

US 2004/0195732 A1    Oct. 7, 2004

Related U.S. Application Data

(62) Division of application No. 09/951,176, filed on Sep. 13, 2001, now abandoned.

(51) Int. Cl.
*B29C 51/10* (2006.01)
*B29C 71/00* (2006.01)

(52) U.S. Cl. .................. 264/553; 264/237; 264/554; 425/388

(58) Field of Classification Search ................ 264/554, 264/348, 335, 553; 425/388
See application file for complete search history.

(56) References Cited

FOREIGN PATENT DOCUMENTS

| JP | 60-33799 A | * | 2/1985 |
|---|---|---|---|
| JP | 4-033827 | * | 5/1992 |

* cited by examiner

*Primary Examiner*—Edmund H. Lee
(74) *Attorney, Agent, or Firm*—Warner Norcross & Judd (57) ABSTRACT

A thermoforming apparatus having a mold with an internal vacuum chamber and a quench for cooling a thermoplastic sheet while it remains on the mold. Because the quench cools the sheet, conventional cooling lines are eliminated from the mold. A preferred process of using the thermoforming apparatus includes drawing a heated sheet over the mold, creating a partial vacuum in the vacuum chamber of the mold to maintain the sheet on the mold and quenching the sheet on the mold in a quenching tank. A preferred process of manufacturing a mold with an interior vacuum chamber includes forming an impression of the mold in a casting media, suspending a vacuum line or vacuum cabinet within the impression and pouring molten material around the vacuum line or vacuum cabinet to form the mold at least partially surrounding the vacuum line or vacuum cabinet. Vacuum holes are drilled through the mold from the mold face to the vacuum chamber.

9 Claims, 14 Drawing Sheets

THERMOFORMING METHOD AND APPARATUS

BACKGROUND OF THE INVENTION

This is a division of application Ser. No. 09/951,176, filed Sep. 13, 2001 (now abandoned).

The present invention relates to thermoforming and more particularly to a method and apparatus for vacuum forming thermoplastics.

Thermoforming is widely used in a variety of industries to manufacture products from thermoplastic materials, such as high-density polyethylene ("HDPE"). Many different thermoforming processes are currently in widespread use, including vacuum forming, blow molding and the like. A typical thermoforming process involves the general steps of heating a thermoplastic material above its glass-transition temperature, shaping the heated thermoplastic by drawing the material over a mold, cooling the thermoplastic to a low enough temperature for it to retain its shape and then removing the shaped thermoplastic from the mold.

Figure 1:
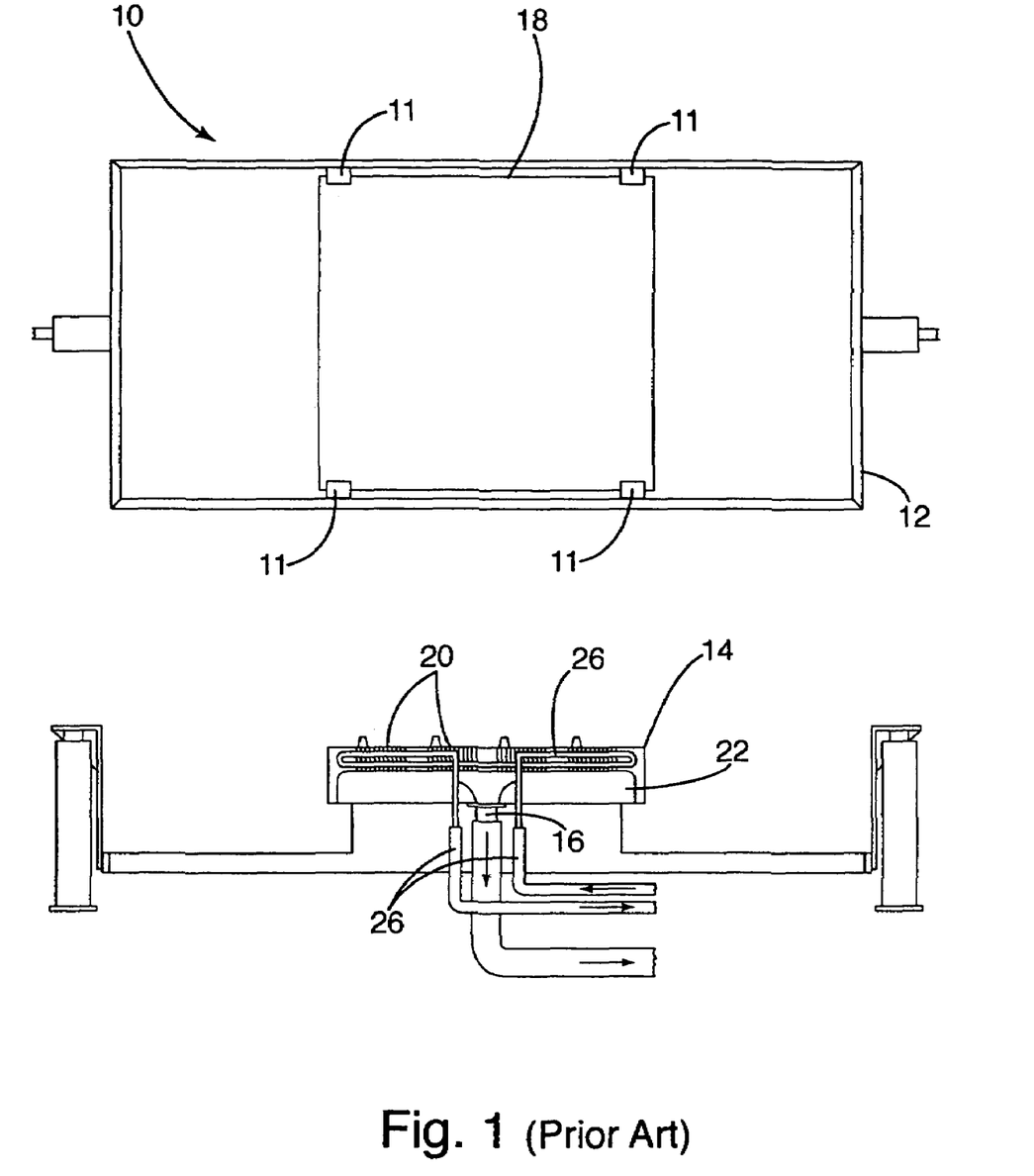
FIG. 1 shows a side elevation view of a prior art thermoforming apparatus.

Vacuum forming is perhaps one of the most versatile thermoforming processes in that it is well suited for use in a wide variety of applications. With vacuum forming, a partial vacuum is used to draw a thermoplastic material against a mold. A conventional vacuum forming apparatus is shown in FIG. 1. The apparatus is configured to thermoform a thermoplastic sheet 18. As illustrated, the conventional apparatus 10 generally includes a movable rack 12 carrying sheet 18 in clamps 11, as well as a mold 14 that is positioned over a vacuum head 16. The undersurface of the mold 14 is shaped to cooperate with the vacuum head 16 to define a vacuum chamber 22. A plurality of vacuum holes 20 extend through the mold 14 from the upper surface to the chamber 22. As a result, operation of vacuum head 16 creates a partial vacuum within chamber 22 that draws air into the chamber 22 through the holes 20. During operation, the rack 12 positions over and parallel to the mold 14. The rack 12 then lowers the thermoplastic sheet 18 onto the mold 14 while a partial vacuum is formed in the chamber 22 by vacuum head 16. The vacuum draws the sheet 18 down over the mold 14 to provide consistent, uniformly shaped articles. The vacuum is retained until the sheet 18 has cooled sufficiently to maintain its shape.

To improve manufacturing efficiency, there is an ongoing effort to reduce the cycle time of thermoforming processes. To date, efforts to reduce cycle time have focused primarily on reduction of the time necessary to heat the thermoplastic sheet beyond its glass-transition temperature. For example, research in this area has lead to the development of a variety of faster heating devices. Despite the focus in the industry on heating time, cooling time is also an important factor in overall cycle time, particularly in view of the significant reductions in heating time. In many conventional applications, the mold 14 includes an internal network of coolant lines 26 that circulate a coolant, such as water, to lower the temperature of the mold 14 and consequently the temperature of the sheet 18.

Conventional coolant line arrangements suffer from several significant drawbacks. First, coolant lines present an obstacle with respect to the formation of the vacuum holes 20 in the mold 14. Conventional molds 14 are manufactured by casting the mold in place about the coolant lines. The vacuum holes are then drilled through the mold at the appropriate locations. Because the coolant lines are entrapped within the mold, the vacuum holes must be carefully position so that they do not penetrate or rupture the coolant lines. This may prevent the vacuum holes from being located as would otherwise have been desired. Second, coolant lines typically do not provide uniform temperature across the mold. Instead, coolant lines generally cause different bands of temperature along the mold 14. For example, areas closer to a coolant line will be cooler than those located farther away. This results in non-uniform cooling along the sheet 18. Third, with complex molds, it can be difficult or impossible to locate cooling lines in certain areas of the mold. This reduces the cooling effect of the coolant lines in such areas.

Other techniques that have been used to reduce cooling time include cooling the sheet with water and nitrogen misting devices. These devices spray a mist of water or nitrogen onto the surface of the sheet after the sheet has been drawn over the mold. Although providing some improvement, these techniques are not without drawbacks. First cooling times associated can vary dramatically with these devices depending on ambient air temperature and humidity. Second, misting devices, particularly nitrogen misting devices, can be expensive to install and operate.

SUMMARY OF THE INVENTION

The aforementioned problems are overcome by the present invention wherein a thermoforming apparatus is provided with a quench for cooling a thermoformed sheet. The mold includes an internal vacuum chamber to hold the sheet as well as an actuation system to move the mold into the quench to cool the sheet while it remains on the mold.

In a preferred embodiment, the vacuum chamber includes a cabinet that is encapsulated within the mold. The mold defines a plurality of vacuum holes extending from the surface of the mold to the vacuum chamber. The cabinet is substantially coextensive with the mold, thereby permitting the disposition of vacuum holes in substantially any location in the mold.

In another preferred embodiment, the vacuum chamber includes a network of vacuum lines encapsulated within the mold. The mold defines a plurality of vacuum holes extending from the surface of the mold to the vacuum lines.

The present invention also provides a thermoforming method in which the thermoplastic sheet is cooled in a quench while remaining on the mold. The method generally includes the steps of (a) heating a thermoplastic sheet beyond its glass-transition temperature, (b) drawing the heated sheet over a mold having an internal vacuum chamber, (c) maintaining the sheet on the mold by creating a partial vacuum within the vacuum chamber, and (d) quenching the thermoplastic sheet in a quench while the sheet remains on the mold.

The present invention further provides a method for manufacturing a thermoforming mold with an internal vacuum chamber. The method generally includes the steps of (a) casting a portion of a mold corresponding to the three dimensional surface of the mold or mold face, (b) positioning a vacuum line or vacuum cabinet opposite the mold face and (c) casting the remainder of the mold around the vacuum line or vacuum cabinet. Vacuum holes may be drilled though the mold face into the vacuum lines or cabinet.

The present invention provides a simple and effective thermoforming method and apparatus that reduces cycle time and is manufactured with only limited changes in conventional mold manufacturing techniques. Because the thermoforming apparatus includes a quench for cooling the sheet, the need for conventional coolant lines is eliminated. This facilitates manufacture of the mold by eliminating the effort needed to avoid the coolant lines when creating vacuum holes in the manufactured mold. Furthermore, use of the quench provides rapid cooling of the thermoplastic sheet at uniform and controlled temperature.

These and other objects, advantages, and features of the invention will be readily understood and appreciated by reference to the detailed description of the preferred embodiment and the drawings.

DETAILED DESCRIPTION OF THE PREFERRED EMBODIMENT

I. Overview

Figure 2:
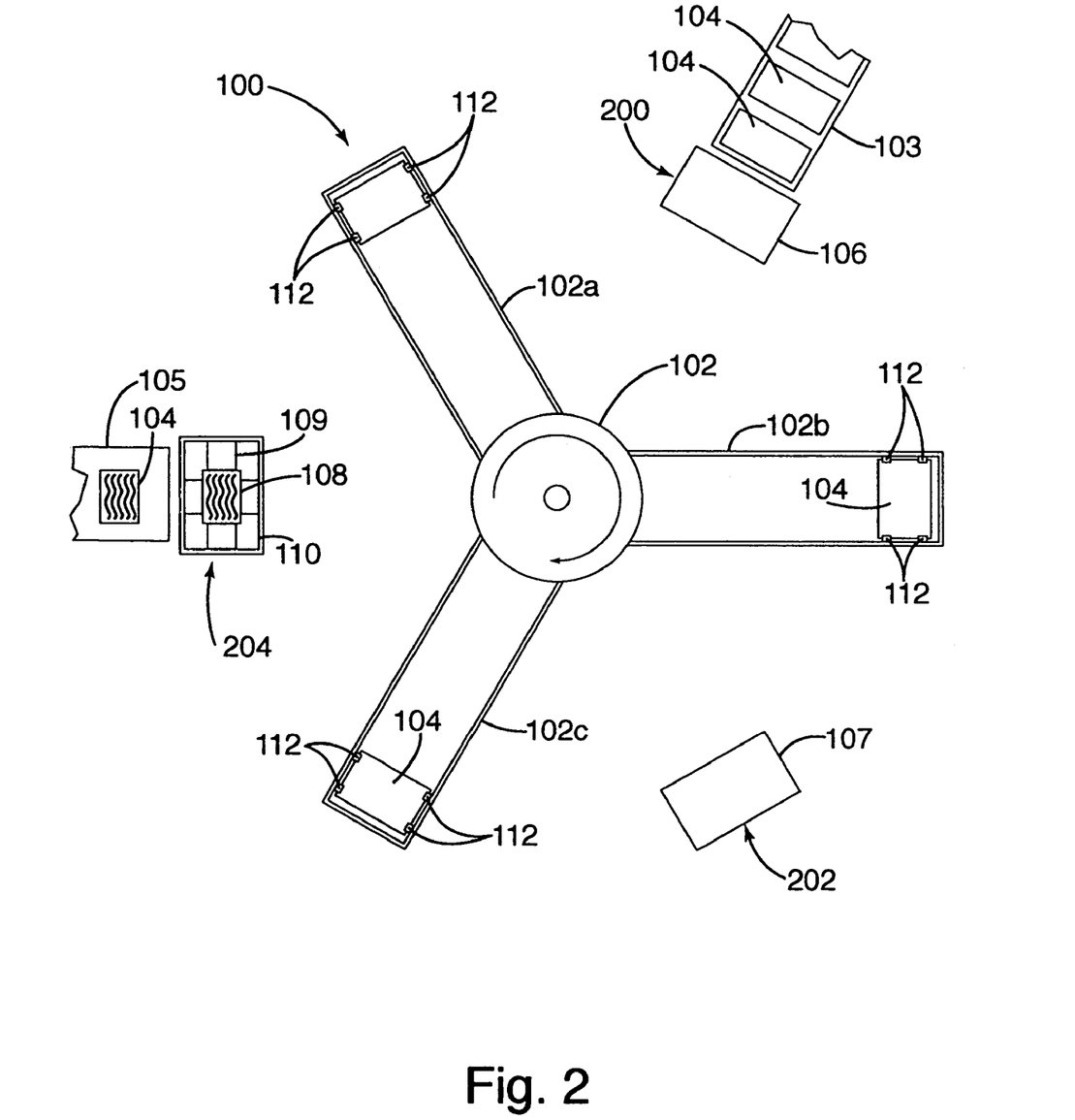
FIG. 2 is a top view of a thermoforming apparatus of the present invention.

A thermoforming system in accordance with a preferred embodiment of the present invention is shown in FIG. 2 and generally designated 100. The thermoforming apparatus generally includes a movable rack 102 that carries thermoplastic sheets 104 through the various stages of a thermoforming process; a loading station 200 for loading sheets 104 onto rack 102, a heater 107 for heating thermoplastic sheets 104, a movable vacuum mold 108 and a quench 110 for cooling the sheet 104 while it remains on the mold 108. In operation, the thermoplastic sheet 104 is loaded onto the rack 102 at loading station 200 and then carried by the rack 102 to a heating station where it is heated by heater 107. The rack 102 then moves the heated sheet 104 adjacent the mold 108, and the sheet 104 is then drawn over the mold via the creation of a partial vacuum within internal vacuum chamber of the mold 108. The mold 108 then moves in conjunction with frame 109 to quench the sheet 104 in the quench 110 while it remains on the mold 108. For purposes of disclosure, the present invention is described in connection with the formation of parts from HDPE. The present invention is well suited for use in manufacturing a wide variety of products using various thermoformable materials, including other thermoplastic materials.

II. Structure

As noted above, the rack 102 functions to carry the sheet 104 through the various steps of the thermoforming process. In a preferred embodiment, the rack 102 is a generally conventional rotary device that rotates through a horizontal plane about a vertical axis. The rack 102 is configured somewhat like a rotary fan, with multiple, radially-spaced rack arms 102a–c, so that multiple operations may be performed on multiple sheets simultaneously. In summary, the multiple rack arms 102a–c permit the simultaneous loading, heating and molding of separate sheets 104. More specifically, sheets 104 arriving on conveyor 103 are loaded onto rack 102 at loading station 200. At the same time, one previously loaded sheet 104 is heated at the heating station 202 by heater 107 and another previously loaded sheet 104 is molded and quenched at the molding station 204 by mold 108 and quenching tank 110.

The rack 102, includes a plurality of clamps 112 arranged in a rectangular configuration. The clamps 112 are positioned to selectively close upon the peripheral margin of the thermoplastic sheet 104. The number and location of clamps 112 will vary from application to application as necessary to adequately hold the sheet 104. The loading station 200 is generally conventional and will not be described in detail here. Briefly, sheets 104 are fed from conveyor 103 and sequentially loaded onto the rack arms 102a–c at loading station 200. In a preferred embodiment, each sheet 104 is manually positioned on the corresponding rack arm 102a–c with its peripheral edge disposed in the open clamps 112. As noted above, the sheet 104 can alternatively be positioned on the rack using conventional "pick-and-place" machinery. The clamps 112 are closed about the periphery of the sheet 104 to securely retain the sheet 104 on the rack. The rack 102 also includes a conventional drive and control assembly (not shown) that rotates the rack arms 102a–c through the various stations. As such, the rack 102 functions to rotate the loaded sheet 104 from the loading station 200 to the heating station 202 and from the heating stations 202 to the molding station 204. Other conventional rack configurations may be substituted for the rotary rack 102, but because of their conventionality, will not be described in detail here.

The heater 107 is generally conventional and will accordingly not be described in detail. In short, the heater 107 of the described embodiment may be any radiant, convection, infrared or other conventional heater, and is preferably provided with standard controls.

Figure 3:
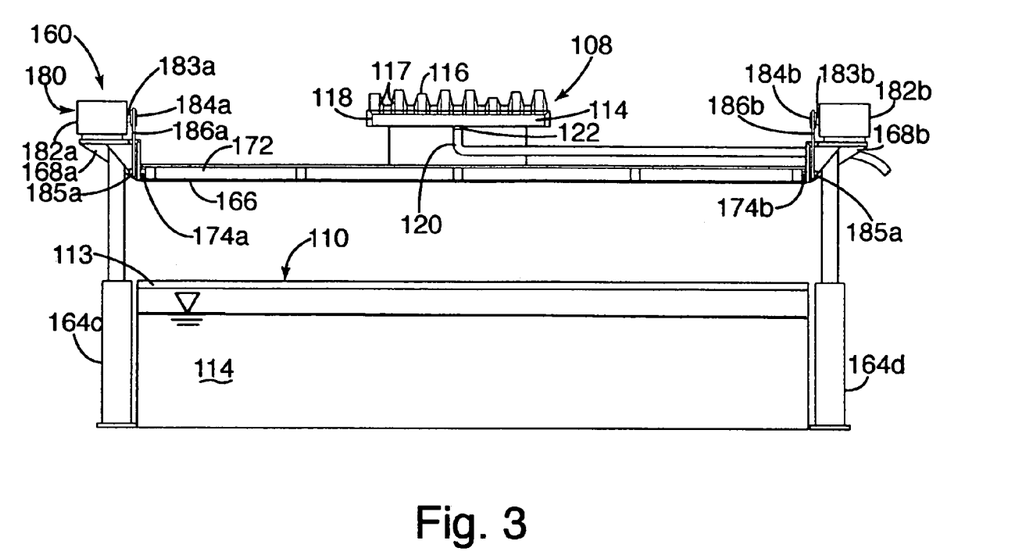
FIG. 3 shows a side elevation view of the thermoforming apparatus.
Figure 4:
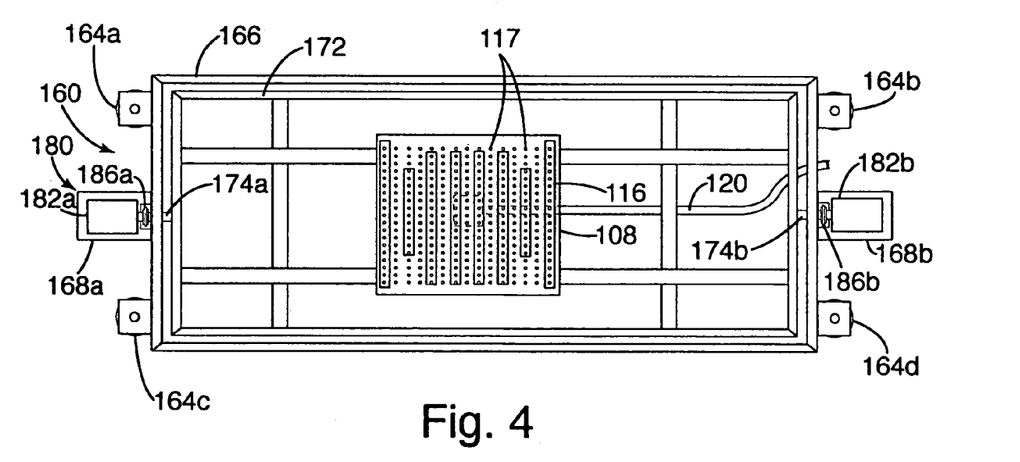
FIG. 4 is a top plan view of the thermoforming apparatus.

Referring now to FIGS. 2–4, the mold 108 includes a three-dimensional surface 116 that is, in a conventional manner, shaped to correspond with the desired product. The mold includes an internal vacuum chamber 114 and a plurality of vacuum holes 117 that extend through the mold 108 from the vacuum chamber 114 to the surface 116. The internal vacuum chamber 114 is preferably defined by a cabinet 118 extending substantially the entire width and depth of the mold 108. The cabinet 118 functions as a large vacuum manifold that is easily intersected by vacuum holes 116. The cabinet 118 preferably includes a vacuum inlet 120 that extends from the mold 108 and terminates in a fitting 122 for connecting the cabinet 118 to a conventional vacuum (not shown).

Figure 5:
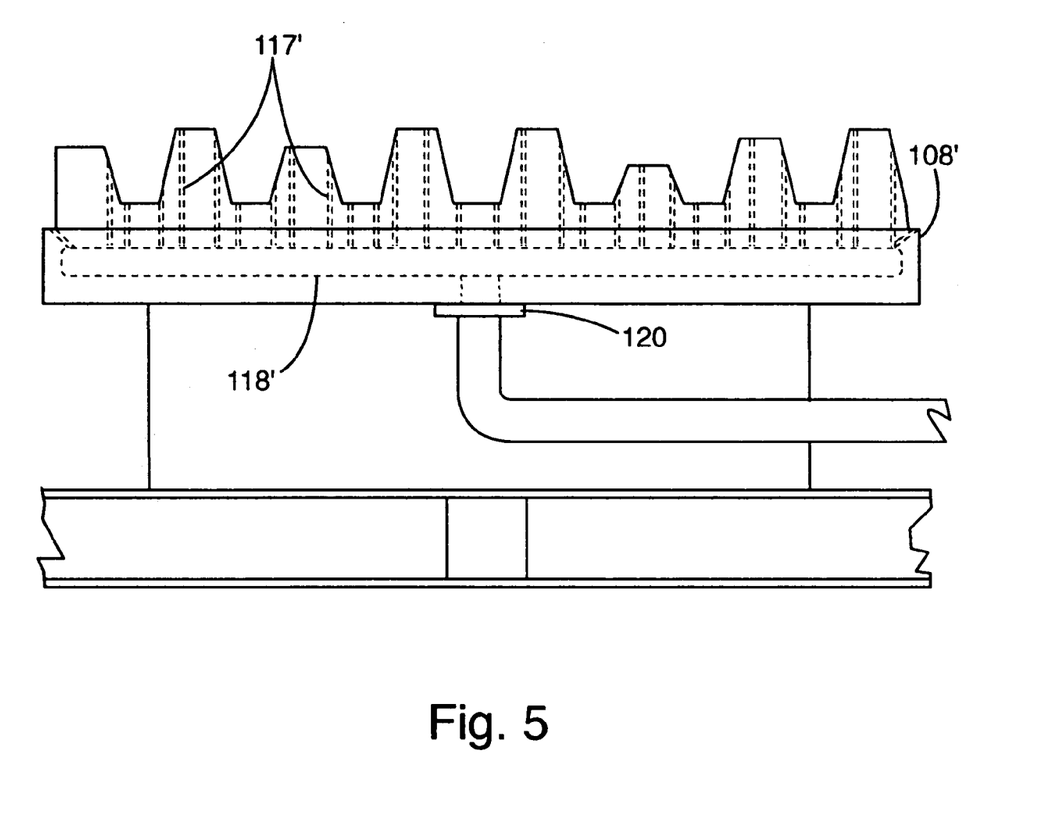
FIG. 5 is a side elevational view of a vacuum line network of the thermoforming apparatus.

As shown in FIG. 5, the internal vacuum chamber can alternatively be defined by a network of lines 118' entrapped within the mold 108'. The network 118' preferably includes a plurality of parallel lines interconnected to a vacuum inlet 120'. The precise location of the lines 118' is preferably generic, for example, spaced evenly every 6 inches alone a single plane. Alternatively, the location of the lines can be application specific, for example, the lines can be located only in areas where vacuum holes are desired. In applications incorporating vacuum lines 118', it is necessary to ensure that the vacuum holes 117' penetrate the vacuum lines 118'.

With further reference to FIGS. 3 and 4, the mold 108 is carried by an actuation system 160 that selectively moves the mold 108 into and out of the rack arms 102a–c and also into and out of quench 110. In general, the actuation system 160 includes four vertically disposed cylinders 164a–d that provide the mold 108 with vertical movement, a carriage 166 mounted atop the vertical cylinders 164a–d, a platen 172 rotatably mounted within the carriage 166, and a drive assembly 180 that rotates the platen 172 to provide the mold 108 with rotational movement.

The four vertically disposed pneumatic or hydraulic cylinders 164a–d are preferably mounted directly to the floor or to a frame (not shown) disposed within or upon the floor. The cylinders 164a–d are preferably operated by a conventional control system (not shown) that extends and retracts the cylinders 164a–d in unison. The carriage 166 is mounted atop the pneumatic cylinders 164a–d to move vertically with the cylinders. The carriage 166 is a substantially rectangular framework having a pair of motor supports 168a–b. The motor supports 168a–b are centrally located on opposite lateral ends of the carriage 166.

The platen 172 is a generally rectangular structure that supports the mold 108 and is fitted within the carriage 166. The platen 172 includes a pair of axles 174a–b extending from opposite lateral ends of the platen 172. The axles 174a–b are centrally located and are fitted into corresponding bearing or bushing assemblies (not shown) in the carriage 166. A platen gear 185a–b is mounted over each axle 174a–b.

The drive assembly 180 includes a pair of electric drive motors 182a–b mounted on motor supports 168a–b. A drive gear 184a–b is mounted on the shaft of each motor 182a–b. A drive chain 186a–b operatively interconnects the motors 182a–b and the platen 172. More specifically, a drive chain 186a–b is fitted over each drive gear 184a–b/platen gear 185a–b combination so that operation of motors 185a–b results in rotation of the platen 172. The respective sizes of the drive gears and platen gears are selected to provide the desired drive ratio. Typically, this ratio will be selected in view of the characteristics of the drive motors 182a–b and the desired mold rotation speed. The described actuation system 160 is merely exemplary and may be replaced by any of wide variety of actuation systems capable of moving the mold 108 into and out of the quench 110.

The quench 110 is shown in FIGS. 3 and 6–11, and generally includes a reservoir 113 containing a volume of quenching fluid 114. The quench 110 is preferably disposed immediately below the mold 108 so that the mold 108 and thermoformed sheet 104 can be lowered into the quench 110 immediately after forming. In the described embodiment, the reservoir 113 is a tub of sufficient size to receive the formed part 105 while it remains on the mold 108. The quenching fluid 114 is preferably water, but may be oil, coolant or other liquids. If desired, the quenching fluid 114 can alternatively be a non-liquid substance having substantially fluid-like characteristics. For example, the quenching fluid 114 can be a vibrating mass of ceramic beads (not shown).

The temperature of the quenching fluid 114 or other quenching medium is preferably maintained by a conventional temperature control system (not shown). The temperature control system may include chillers and/or heaters as needed to maintain the quenching medium at the desired temperature. Chiller and heaters capable of maintaining the quenching medium at a desired temperature are well known. By maintaining the quenching fluid at a substantially constant temperature, the cooling time of the formed part can also be held substantially constant. Each time the mold 108 and thermoplastic sheet 104 are submerged in the quenching fluid 114 and cooled, the temperature of the fluid 114 optionally may be tested and cooled to maintain it at a desired temperature.

II. Operation

Operation of the present invention will be described with particular reference to FIGS. 2 and 6–11. In operation, the sheet 104 is loaded into the rack 102 at a loading station 200. More specifically, one from the rack arms 102a–c is positioned adjacent loading station 200. Clamps 112 are opened to prepare the rack 102 to receive the sheet 104. The sheet 104 is then positioned on the rack 102 within its peripheral edges located between the open jaws of the corresponding clamps 112. The sheet 104 can be positioned manually or through the use of conventional "pick and place" machinery. Once the sheet 104 is positioned, the clamps 112 are closed to grip the peripheral edges of the sheet 104.

The rack 104 then rotates to advance sheet 104 to a heating station 202 where heat is applied to the sheet 104 with heater 107. The rack 104 is typically automated, for example, by gear- or chain-driven rotation and translation (not shown). The rack 102 may alternatively be set-up as a conventional track-fed system to move sheets 104 to different stations. If desired, the rack 102 may be moved manually. At the heating station 202, the heater 107 applies the desired amount of heat energy to the sheet 104. Typically, the sheet 104 will be heated a predetermined number of degrees above its glass-transition temperature.

Figure 6:
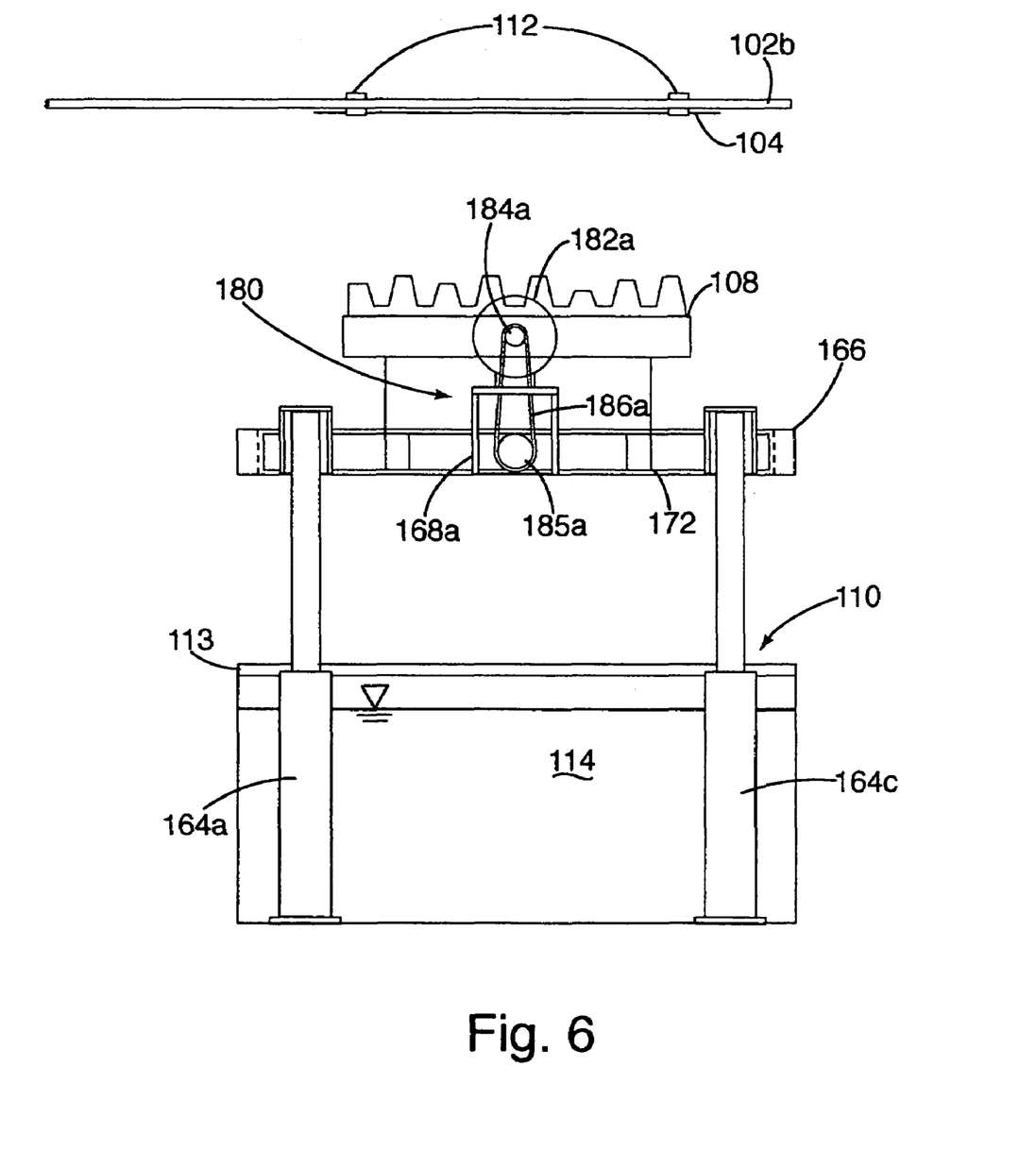
FIG. 6 is a front elevational view of the thermoforming apparatus before vacuum molding a thermoplastic sheet.
Figure 7:
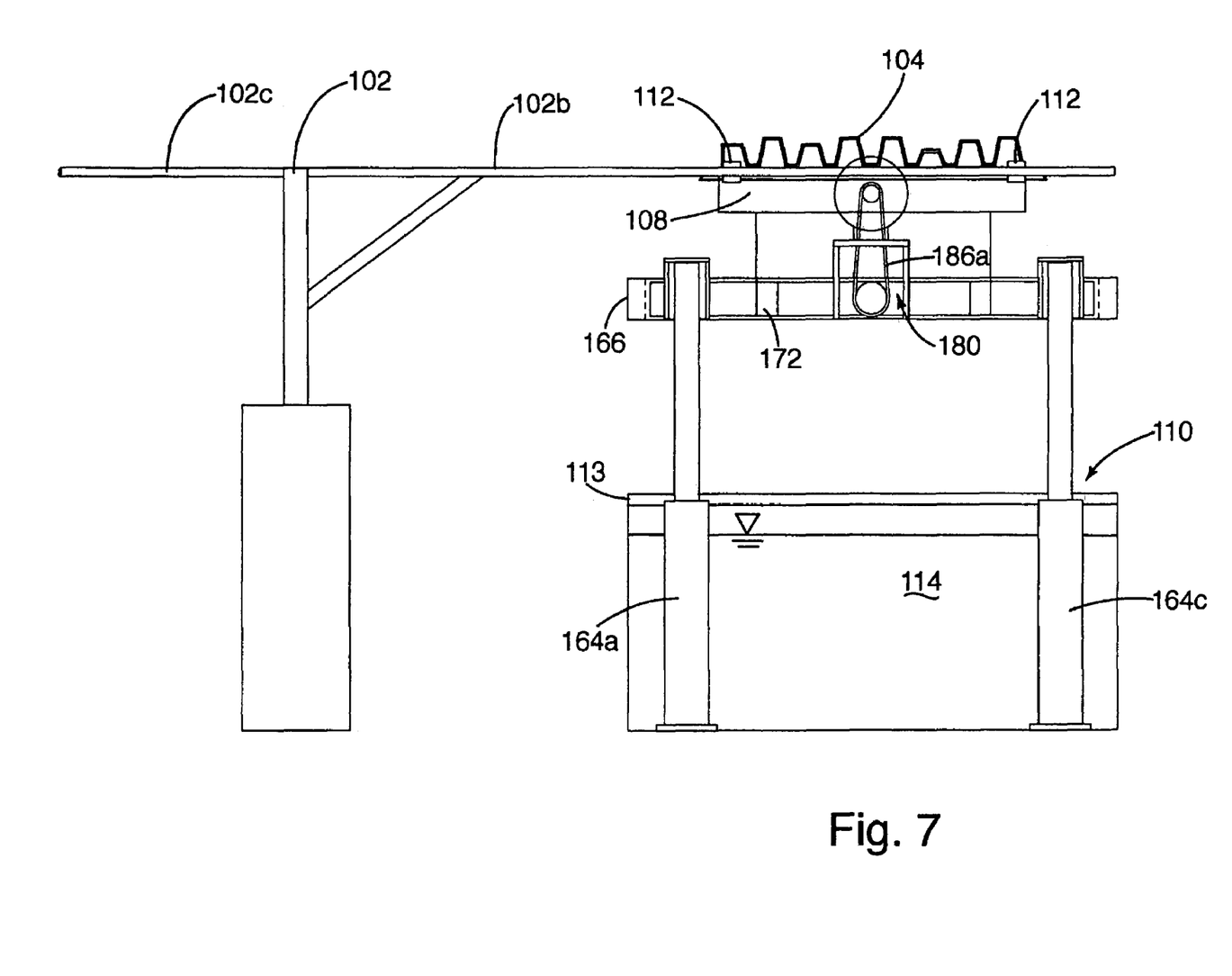
FIG. 7 is a front elevational view of the thermoforming apparatus as a sheet is vacuum formed.
Figure 8:
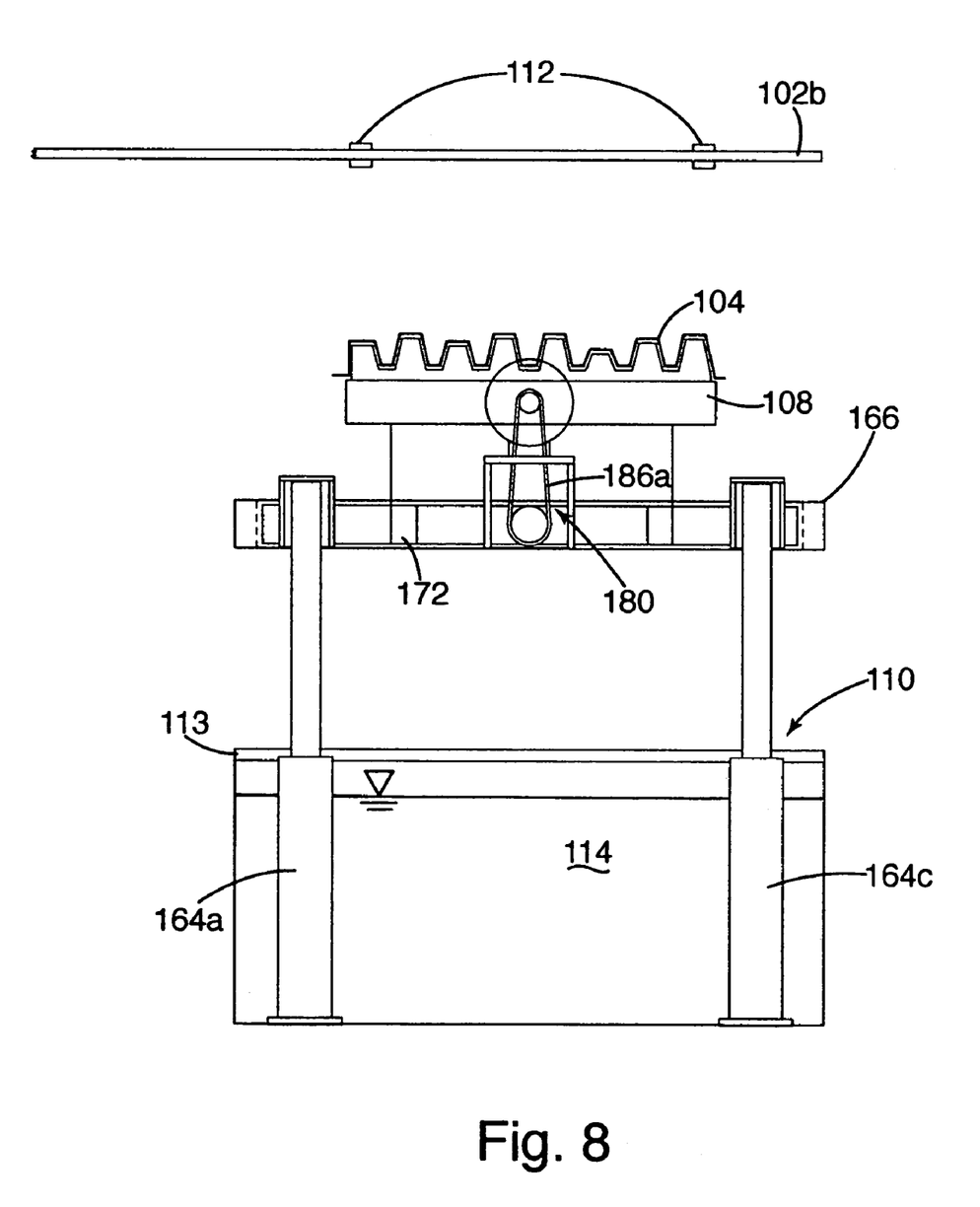
FIG. 8 is a front elevational view of the thermoforming apparatus with a thermoplastic sheet drawn on the vacuum mold.

With reference to FIG. 2, the rack arm 102a, b or c carrying the heated sheet 104 is then rotated to the molding station 204, which is best shown in FIG. 6. In the mold station, the rack 102b aligns the sheet 104 over the mold 108. Next, as shown in FIG. 7, the mold 108 is raised into contact with the sheet 104 by extension of the vertical cylinders 164a–d. At the same time, the vacuum source is switched on, creating a partial vacuum within the vacuum chamber 114 and drawing air through the vacuum holes 116 (FIGS. 3 and 5). The mold 108 is raised until the sheet is sufficiently drawn onto the three-dimensional surface of the mold. Once the sheet 104 is drawn fully over the vacuum mold 108, the clamps 112 release so that the formed sheet 104 is free to move with the mold 108. As shown in FIG. 8, the mold 108 is then withdrawn from the arm 102 with cylinders 164a–d. In an alternative embodiment, the rack 102 may be provided with a vertical drive mechanism that permits the appropriate rack arm 102a–c to be lowered to bring the sheet into contact with the surface of the mold 108 and then raised after the sheet 104 has been released on the mold 108.

Figure 9:
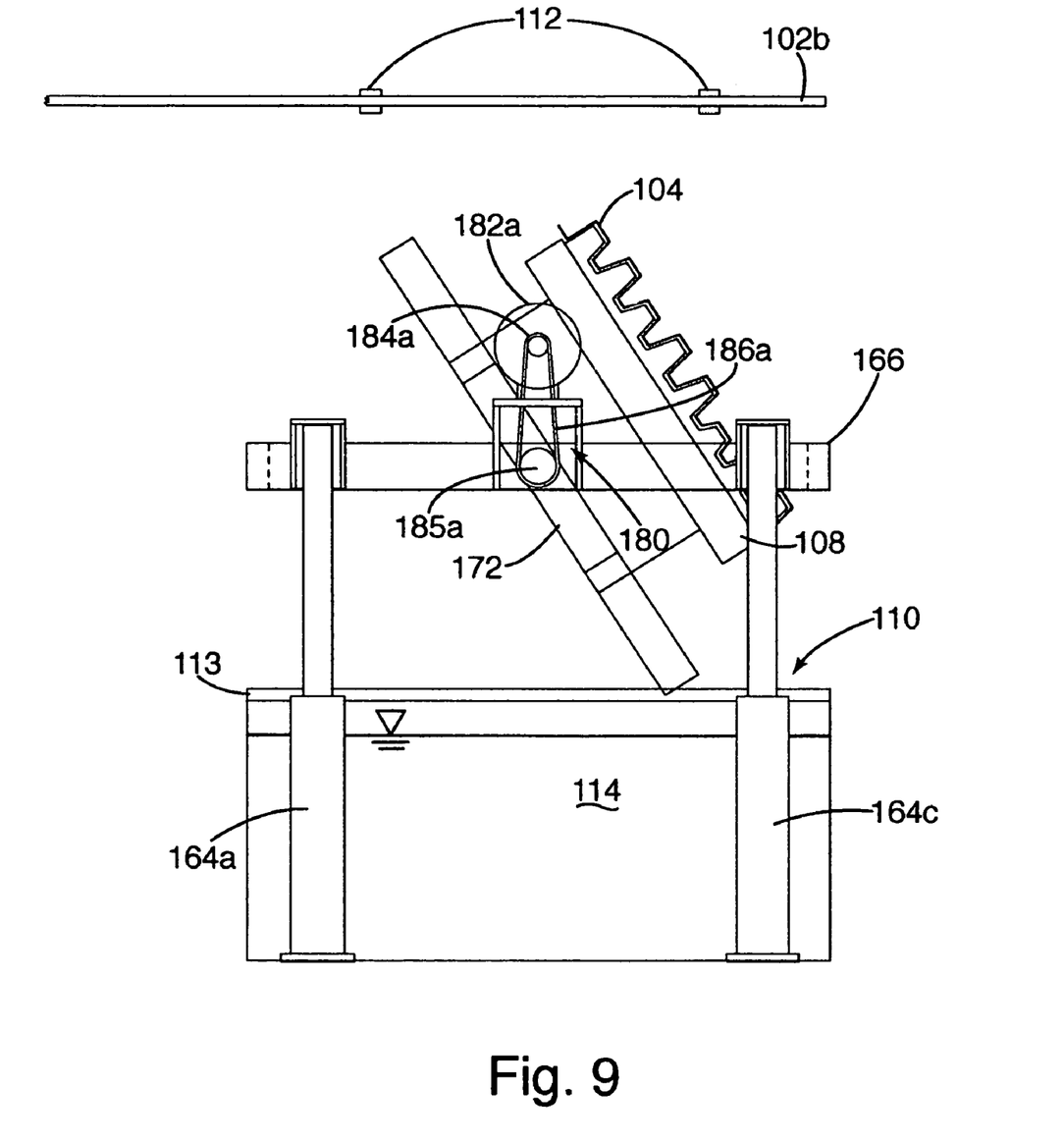
FIG. 9 is a front elevational view of the thermoforming apparatus with the mold in a partially rotated position.
Figure 10:
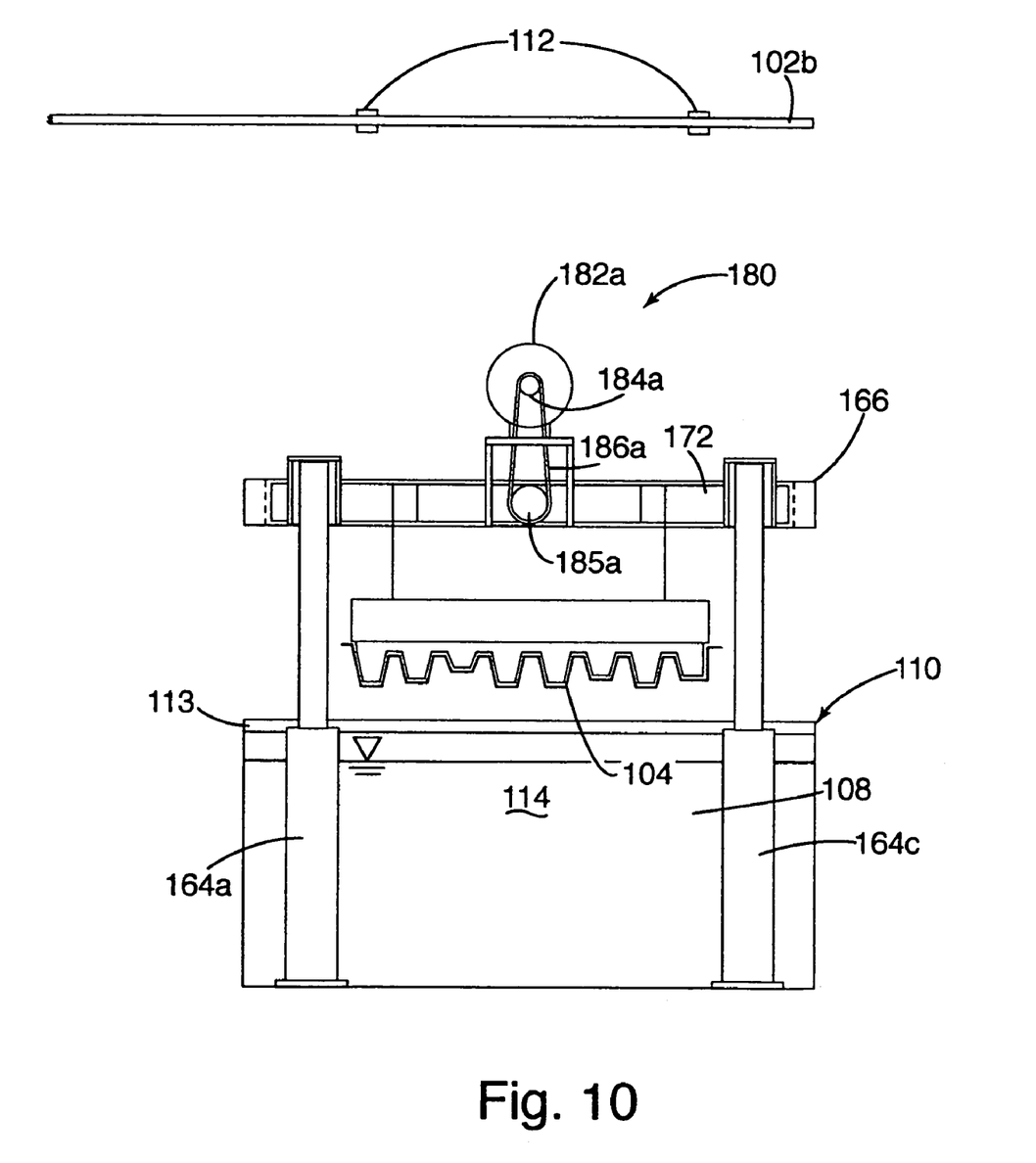
FIG. 10. is a front elevational view of a thermoforming apparatus positioned over the quenching tank.

Next, the actuation system 160 lowers the mold 108 and sheet 104 into the quench 110. With reference to FIGS. 9 and 10, the drive assembly 180 first rotates the platen 172 about 180 degrees so the mold 108 is suspended beneath the carriage 166 in an inverted orientation. The platen 172 is rotated by operation of motors 182*a*–*b*. The motors 182*a*–*b* rotate the drive gears 184*a*–*b*, which in turn drive the drive chains 186*a*–*b*. Movement of the drive chains 186*a*–*b* causes rotational movement of the platen gears 185*a*–*b* and ultimately the platen 172.

Figure 11:
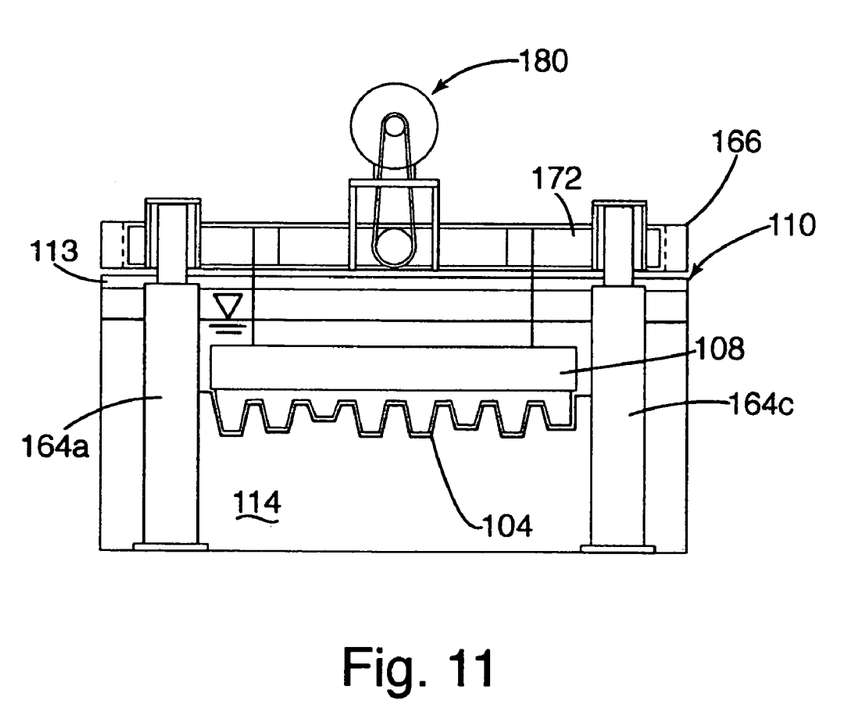
FIG. 11 is a front elevational view of the thermoforming apparatus as the mold and thermoplastic sheet is submerged in the quenching tank.

Once the platen 172 is rotated as shown in FIG. 10, the carriage 166 is lowered by operation of the vertical cylinders 164*a*–*d*. As shown in FIG. 11, the vertical cylinders 164*a*–*d* are retracted in unison, thereby lowering the carriage 166 and immersing the mold 108 and sheet 104 into the quench 110. The mold 108 and sheet 104 remain submerged in the quench 110 for a predetermined period of time selected to permit the sheet 104 to cool sufficiently so that it does not undergo deformation when removed from the mold 108. The mold 108 is then lifted from the quench 110. The vertical cylinders 164*a*–*d* are extended in unison lifting the carriage 166, platen 172, mold 108 and sheet 104 from the quenching fluid 114. Once the vertical cylinders 164*a*–*d* are sufficiently extended, the platen 172 is rotated 180 degrees by drive motors 182*a*–*b* to return the mold 108 to the upright position. The vacuum is then released, preferably by opening the vacuum chamber 114 (FIGS. 3 and 5) to the environment. The sheet 104 may then removed from the mold 108 by reversing the vacuum and blowing the sheet 104 (now fully formed into a part) off from the mold 108. Optionally, the sheet is removed by hand or by a conventional pick-and-place mechanism, and placed on conveyor 105 for further processing (FIG. 2). The process is repeated for the desired number of sheets.

III. Manufacture of the Mold

The mold 108 is preferably manufactured in the process shown in FIGS. 12A–D. In general, the process includes defining a mold impression 455 in mold media 454, positioning a vacuum cabinet 118 or vacuum lines 118' (collectively referred to as a vacuum chamber 114), pouring molten material into the mold impression 455 over or around the vacuum chamber 114 to form the mold 108. After the mold 108 is removed from the casting box 450, vacuum holes may be drilled through the mold face at pre-selected positions to provide fluid communication between the vacuum chamber 114 and the environment.

Figure 12A:
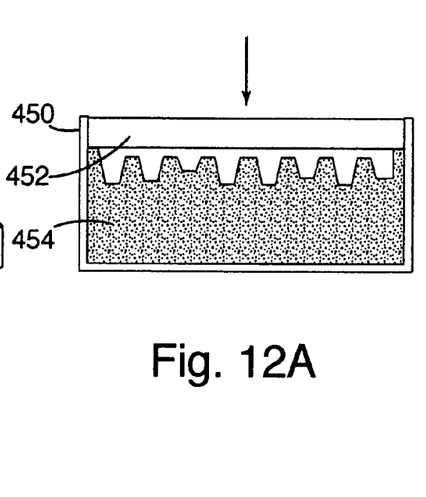
FIG. 12A–D show the various steps of a process for manufacturing the thermoforming mold of the present invention.

With further reference to FIGS. 12A–D, the mold media 454 preferably is sand or other conventional casting media. This media is disposed in casting box 450. As shown in FIG. 12A, a casting tool 452 is pressed into the media 454 to create an impression of the tool in the media. The tool 452 is generally conventional and is preferably of wood, carved in the shape of the desired mold and thermoformed article. As will be appreciated, other conventional molding tools or techniques may be used to form an impression in the media 454.

Figure 12B:
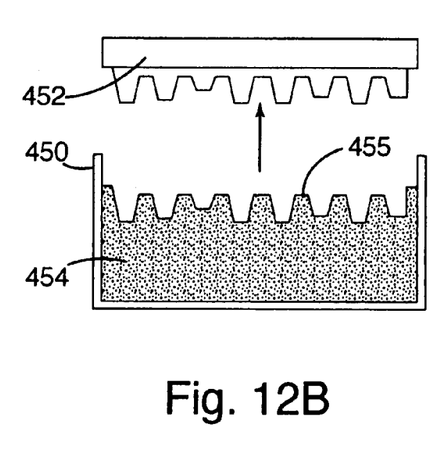

Referring now to FIG. 12B, the molding tool 452 is withdrawn from the box 450, leaving a mold impression 455 in the media 454.

Figure 12C:
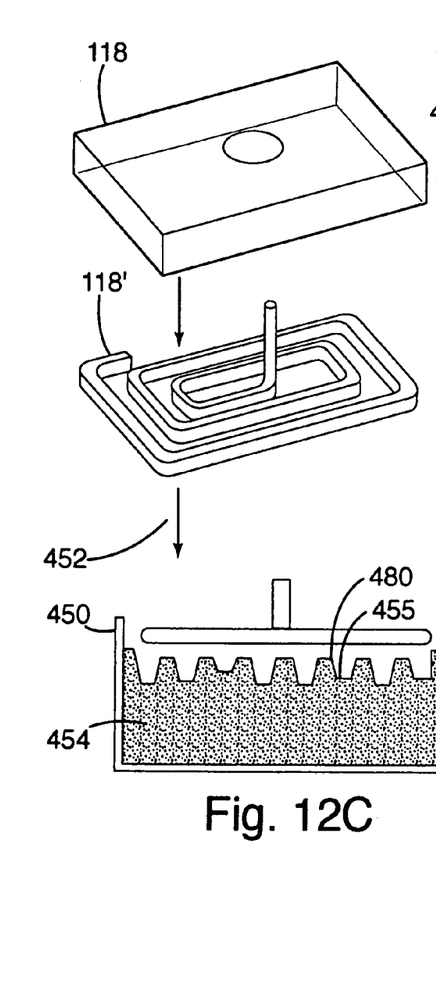

As shown in FIG. 12C, the vacuum chamber 114 (defined by vacuum cabinet 118 or vacuum lines 118') is suspended in the mold impression 455. The vacuum chamber 114 is preferably held in the desired location by wire or other conventional techniques. As noted above, the vacuum chamber 114 is preferably a hollow cabinet 118 constructed of virtually any material that does not substantially deform when in contact with the molten material used to cast the mold 108. Preferably, the vacuum cabinet 118 is aluminum alloy, but other materials may be used, depending on the casting material and the amount of allowable deformation of the cabinet. The vacuum chamber 114 may alternatively be defined by a network of vacuum lines 118'. In such applications, the vacuum lines 118' may be arranged in a coil form as shown. Optionally, the lines may be in any pattern to optimize the vacuum source available to the exterior contours of the mold face 480. For example, the vacuum lines 118' may be defined in a grid-like pattern or the lines may arranged so that they are closest to the areas of the mold face 480, i.e., the valleys or crevices of the three-dimensional surface, that require the most draw to pull thermoplastic into them during a thermoforming operation. Moreover, both a cabinet 118 and a vacuum line 118' may be positioned and cast into the mold 108 in certain applications as desired.

Figure 12D:
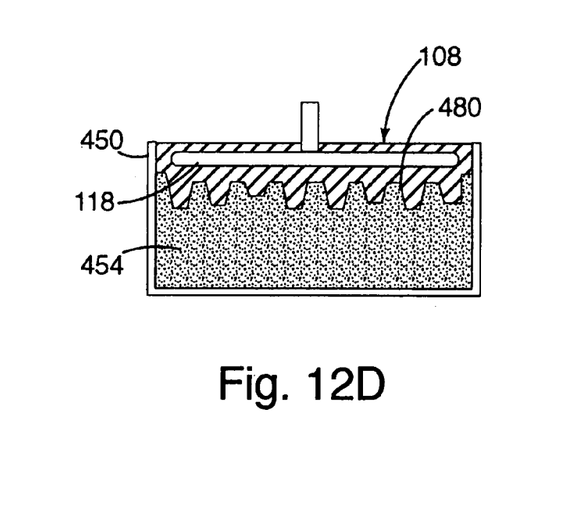

The next step is illustrated in FIG. 12D. In this step, casting material is poured into the mold impression 455, conforming to the contours thereof. The casting material is preferably aluminum, but any commercially available metal, alloy or synthetic material may be used to form the mold, as the application requires. Preferably, casting material is poured to fill the mold impression 455 extending over and entrapping the vacuum chamber 114. The casting material fills the contours of the mold impression 455 to form a three-dimensional surface of ridges and valleys, or the "mold face" 480. Alternatively, the vacuum chamber 114 can be secured to the undersurface of the mold 108 after the mold has been cast.

Although not separately illustrated, the molten material is permitted to cure and the formed mold 108 is removed from the cavity. Once removed from the cavity, a plurality of vacuum holes may be drilled, punched or otherwise formed through the mold face to provide fluid communication between the vacuum chamber 114 and the mold face 480. Because the mold does not include conventional cooling lines, the vacuum holes may be drilled without worry of damaging one of such lines. Ultimately, many more positions are available through which vacuum holes may be drilled.

IV. First Alternative Embodiment

Figure 13:
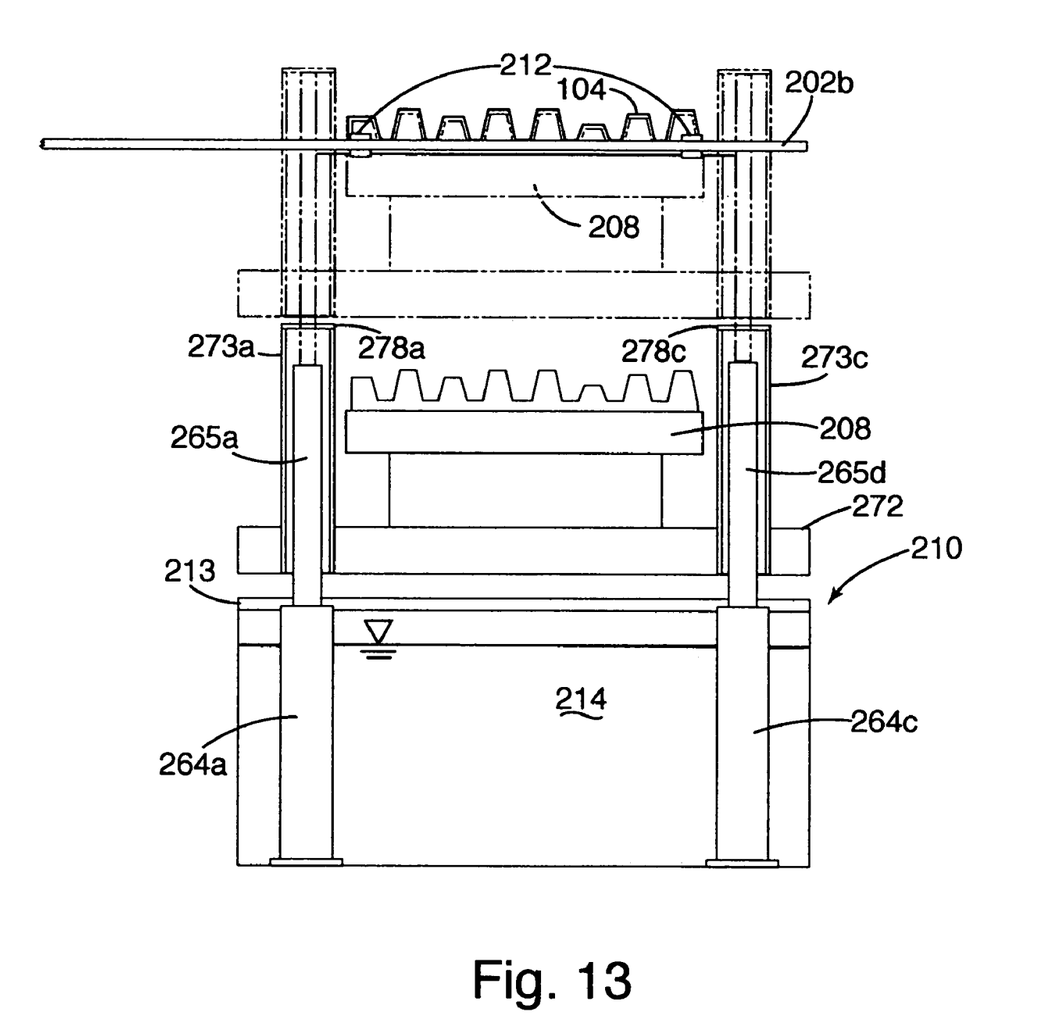
FIG. 13 shows a first alternative embodiment of the thermoforming apparatus.
Figure 14:
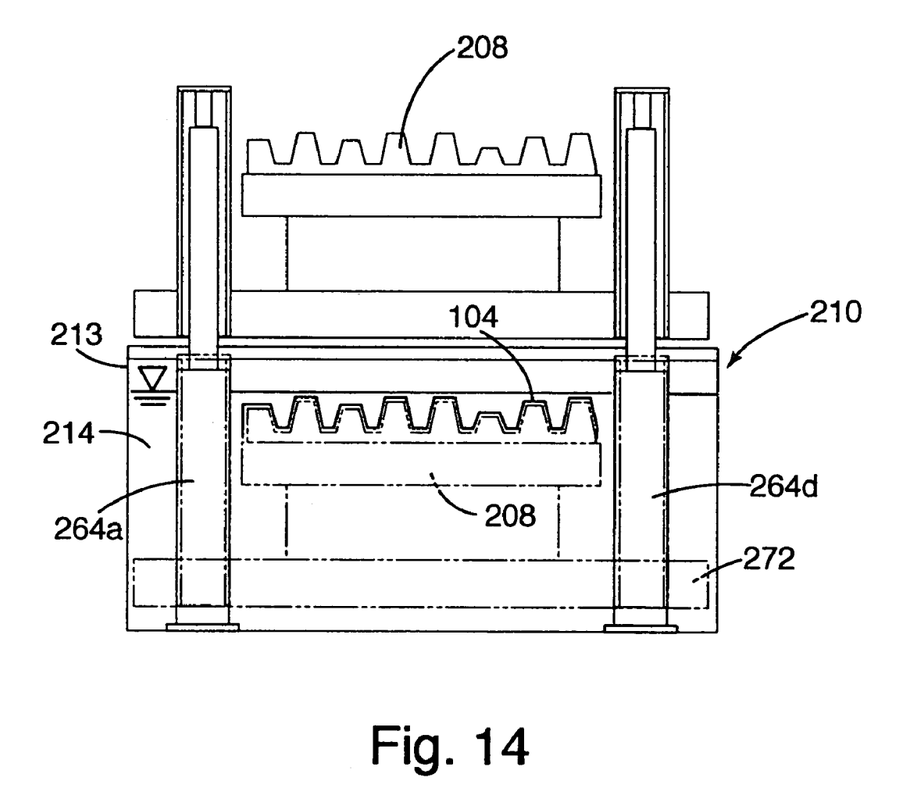
FIG. 14 shows the mold being submerged in a quenching tank of the first alternative embodiment.

A first alternative embodiment of the present invention is shown in FIGS. 13 and 14. This embodiment includes most of the same components of the preferred embodiment, except the drive assembly. The hydraulic cylinders 264*a*–*d* are similar to the hydraulic cylinders of the preferred embodiment, except that the rams 265*a*–*d* preferably are telescoping and that the carriage 272 is fixed to the carriage supports 273*a*–*d*, a distance below the tops of the supports 278*a*–*d*. In operation, the mold 208 is lifted in unison by the hydraulic telescoping cylinders 264*a*–*d* to engage a sheet 104 supported on the rack 202*b* in a manner identical to that of the preferred embodiment. The mold 208 is shown in the raised position in FIG. 13 in phantom lines. When the mold 208 is withdrawn with the sheet 104 vacuum drawn against it, rather than rotating, the carriage platen 272 is drawn downward in unison by the hydraulic cylinders 264*a*–*d*, until as shown in phantom lines in FIG. 14 the carriage 272 is positioned within the quenching tank 213. There, the sheet 104 is cooled and formed as described in connection with the preferred embodiment. After the sheet 104 is permitted to cool sufficiently, the hydraulic cylinder rams 265*a*–*d* are extended in unison, lifting the carriage 272, mold 108 and sheet 104 from the quenching tank 213. The sheet 104 may be removed from the mold with any of the techniques described in connection with the preferred embodiment or other conventional removal techniques. This process may be repeated as desired to mold a number of sheets.

V. Second Alternative Embodiment

Figure 15:
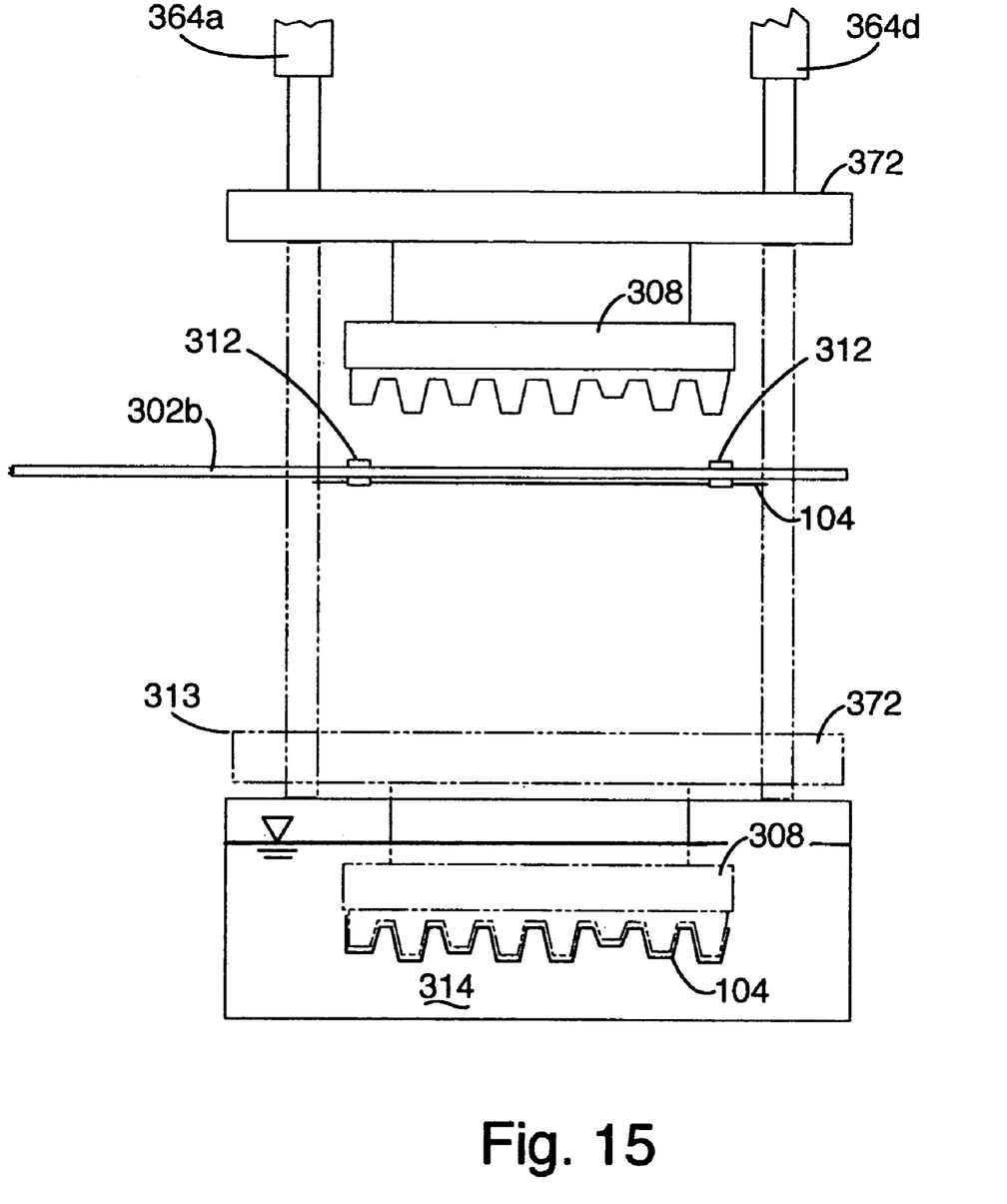
FIG. 15 shows a second alternative embodiment of the thermoforming apparatus.

A second alternative embodiment of the present invention is shown in FIG. 15. The forming apparatus shown in FIG. 15 generally includes an inverted mold 308 mounted to carriage 372 which is further mounted to inverted hydraulic cylinders 364a–d. In operation, the hydraulic cylinders lower carriage 372 and mold 308 down through rack arm 302b so that the sheet 104 may be drawn against the mold 308 as described in the preferred embodiment. The carriage 372 is further descended in unison by the hydraulic cylinders 364a–d so that the mold 308 and sheet 104 associated with it are positioned in the quenching tank 313 where the liquid 314 is permitted to cool the sheet 104. The mold 108 is shown in the fully lowered position in FIG. 15 in phantom lines. Once the sheet 104 is sufficiently cooled it may be withdrawn on the mold 308 via the hydraulic cylinders 364a–d. The sheet 104 may be removed from the mold with any of the techniques described in connection with the preferred embodiment or other conventional removal techniques. This process may be repeated as desired to mold a number of sheets.

The above description is that of the preferred embodiments of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The invention claimed is:

1. A method for forming a sheet of thermoplastic material, comprising:
   providing a vacuum mold having a surface and a vacuum chamber, said mold defining a plurality of vacuum holes extending between said surface and said vacuum chamber;
   providing a quench containing a quench media comprised of at least one of a liquid and ceramic beads;
   heating the thermoplastic material;
   vacuum forming said heated thermoplastic material on said surface by applying a partial vacuum to the thermoplastic material through said vacuum holes;
   moving one of said quench and said mold to quench said thermoplastic material in said quench media while said thermoplastic material is retained on said surface of said mold.

2. The method of claim 1 wherein said moving step includes moving said quench towards said mold so that at least a portion of said mold is positioned within said quench while said thermoplastic material is retained on said mold, whereby at least a portion of the thermoplastic material is in direct contact with said quench media.

3. The method of claim 1 wherein said providing said quench includes providing a quench reservoir, said quench reservoir being of sufficient size to receive said mold while a thermoplastic material is retained on said mold.

4. The method of claim 1 further comprising maintaining said quench media at a substantially constant temperature.

5. The method of claim 1 wherein said moving step includes moving one of said quench and said mold by actuating a plurality of hydraulic cylinders.

6. The method of claim 1 comprising holding at least one sheet of the thermoplastic material in a supported position on a rack.

7. The method of claim 1 including supporting said mold on a carriage that is translatable between a first position wherein said mold contacts and draws said sheet and a second position wherein said carriage disposes said mold with said sheet retained thereon in said quench.

8. The method of claim 7 comprising rotating said carriage along an axis so that in said first position said mold faces said sheet and so that in said second position said mold faces said quench.

9. The method of claim 7 including translating said mold between said first and second positions by rotating said carriage about 180 degrees.

* * * * *